United States Patent
Etheve

Patent Number: 5,915,619
Date of Patent: Jun. 29, 1999

[54] HEATING SYSTEM FOR AUTOMOBILES

[76] Inventor: Pierre Etheve, 7, Avenue Charles Peguy, 77000 Melun, France

[21] Appl. No.: 08/609,372

[22] Filed: Mar. 1, 1996

[30] Foreign Application Priority Data

Mar. 2, 1995 [FR] France .................................. 95 02417

[51] Int. Cl.⁶ ............................... B60H 1/02; B60H 3/00
[52] U.S. Cl. ............................... 237/12.3 A; 237/12.3 R; 165/41; 165/51; 165/52; 165/155; 165/156
[58] Field of Search ........................ 237/12.3 A, 12.3 R; 165/41, 51, 52, 154, 155, 156

[56] References Cited

U.S. PATENT DOCUMENTS

| | | | |
|---|---|---|---|
| 1,077,160 | 10/1913 | Reese | 165/155 |
| 1,126,011 | 1/1915 | Hubbard | 165/155 |
| 1,319,628 | 10/1919 | Simmons | 165/52 |
| 1,508,383 | 9/1924 | Densley | 237/12.3 A |
| 1,589,758 | 6/1926 | Hogg | 165/52 |
| 1,670,776 | 5/1928 | Losee | 237/12.3 A |
| 1,684,599 | 9/1928 | Ryder | 237/12.3 A |
| 1,715,630 | 6/1929 | Shell | 165/51 |
| 1,752,615 | 4/1930 | Roof | 237/12.3 A |
| 1,753,615 | 4/1930 | Miller | 237/12.3 A |
| 1,775,939 | 9/1930 | Matthaei | 165/155 |
| 1,795,734 | 3/1931 | Otwell | 237/12.3 A |
| 1,842,244 | 1/1932 | Boyle | |
| 1,864,901 | 6/1932 | Gilbert | 165/51 |
| 1,917,023 | 7/1933 | Evans | 165/51 |
| 2,068,739 | 1/1937 | Francisco et al. | 165/51 |
| 2,087,617 | 7/1937 | Francisco | 165/51 |
| 2,228,955 | 1/1941 | Heath | 165/52 |
| 3,366,336 | 1/1968 | Neuschwanger et al. | 239/129 |

FOREIGN PATENT DOCUMENTS

| | | |
|---|---|---|
| 658031 | 5/1929 | France . |
| 1089507 | 3/1955 | France . |
| 1254593 | 11/1971 | United Kingdom .............. 237/12.3 A |

*Primary Examiner*—John K. Ford
*Attorney, Agent, or Firm*—Pennie & Edmonds LLP

[57] ABSTRACT

The present invention concerns a heating device for motor vehicles comprising a heat exchanger with primary and secondary circuits. The said exchanger is connected, through a system of ducts to the passenger compartment of the vehicle and/or to the front and/or the rear windows of the same. The said device is intended to heat the said passenger compartment and/or to de-ice the said front and/or rear windows. Under the invention, the said heat exchanger (3) is placed at the engine (M) exhaust of the said vehicle (1). The exchanger (3) primary circuit (12) is on the one hand, connected to the outlet of any cylinders (C) of the engine (M) so as to be crossed by the exhaust gases from the latter and, on the other hand, it is connected to the manifold (13) leading to the muffler.

21 Claims, 2 Drawing Sheets

HEATING SYSTEM FOR AUTOMOBILES

The present invention deals with a heating device for motor vehicles. Such a can be used not only to heat the passenger compartment but also to de-ice the windshield and/or the vehicle back window.

Usually, such a heating device is made up of a heat exchanger placed on the engine cooling system and it is meant to recover some of the engine heat. Although that may be satisfactory, it would be desirable to increase the heating efficiency in a vehicle, namely in case such a device is used for de-icing the front and/or rear windows of the vehicle. This is the purpose of the present invention.

To this end, a heating device for motor vehicles comprising a heat exchanger including a primary and a secondary circuit, the exchanger being connected through a system of ducts to the passenger compartment of the vehicle and/or to the front and/or rear windows of the vehicle, such a device meant for heating the passenger compartment and/or for de-icing the front and/or rear windows, is remarkable under the invention in that the heat exchanger is placed at the engine exhaust of the vehicle, the primary circuit of the exchanger being connected, to the output of the engine cylinders in a way to be crossed by the exhaust gases of the engine and, to the exhaust pipe leading to the muffler.

The secondary circuit air once in contact with the primary circuit is thus very effectively heated through thermal exchange with exhaust gases before being used to heat the passenger compartment of the vehicle and/or to de-ice the front and/or rear windows of it.

Favorably, the primary circuit of the heat exchanger affords the general shape of a cylindrical case crossed at least on the major part of its length by at least one pipe, thus creating around the pipe a ring-shaped chamber which presents, side holes, each of which is connected by means of a duct to each exhaust vent of every cylinder of the engine. The ring-shaped chamber is also connected to the exhaust pipe while the secondary circuit of the heat exchanger is made up of a cylindrical cover surrounding the primary circuit and including an inlet of fresh (cool) air and an outlet of heated air with the exhaust gases crossing the ring-shaped chamber of the primary circuit.

Thus, fresh air from outside in the cover of the secondary circuit is heated on crossing both the primary circuit pipe and the ring-shaped space between the external wall of the primary circuit case and the internal wall of the secondary circuit cover.

Preferably, the pipe of the primary circuit is placed centrally in the case, while the ring-shaped space between the case and the cover of the secondary circuit surrounds, concentrically, the pipe and the ring-shaped chamber of the primary circuit.

In the ring-shaped space in particular, radial blades can be provided to play the part of spacer frames between the primary circuit case and the cover of the secondary circuit. Favorably, the blades are helicoid-shaped allowing air to be directed into the ring-shaped space.

Under another feature of the invention, a blower is provided upstream the cover inlet of the heat exchanger secondary circuit to blow the heated air toward the passenger compartment of the vehicle and toward the front and rear windows. The same blower can be driven by hand or electronically, namely by means of a thermostat.

And again, under another feature of the invention, a stub duct is provided downstream the outlet duct of the secondary circuit to help adjust heated air output and its spreading over for heating the passenger compartment and/or de-icing the front and/or the rear windows.

Under other features of the invention first and second de-icing vent(s) are provided in order to de-ice, respectively, the windshield and the back window of the vehicle. Those vent(s) are placed on the windshield lower part and on the back window upper part, respectively, and each of them is connected through a pipe, to the heat exchanger.

The figures enclosed will help understand how the invention can materialize:

Figure 1:
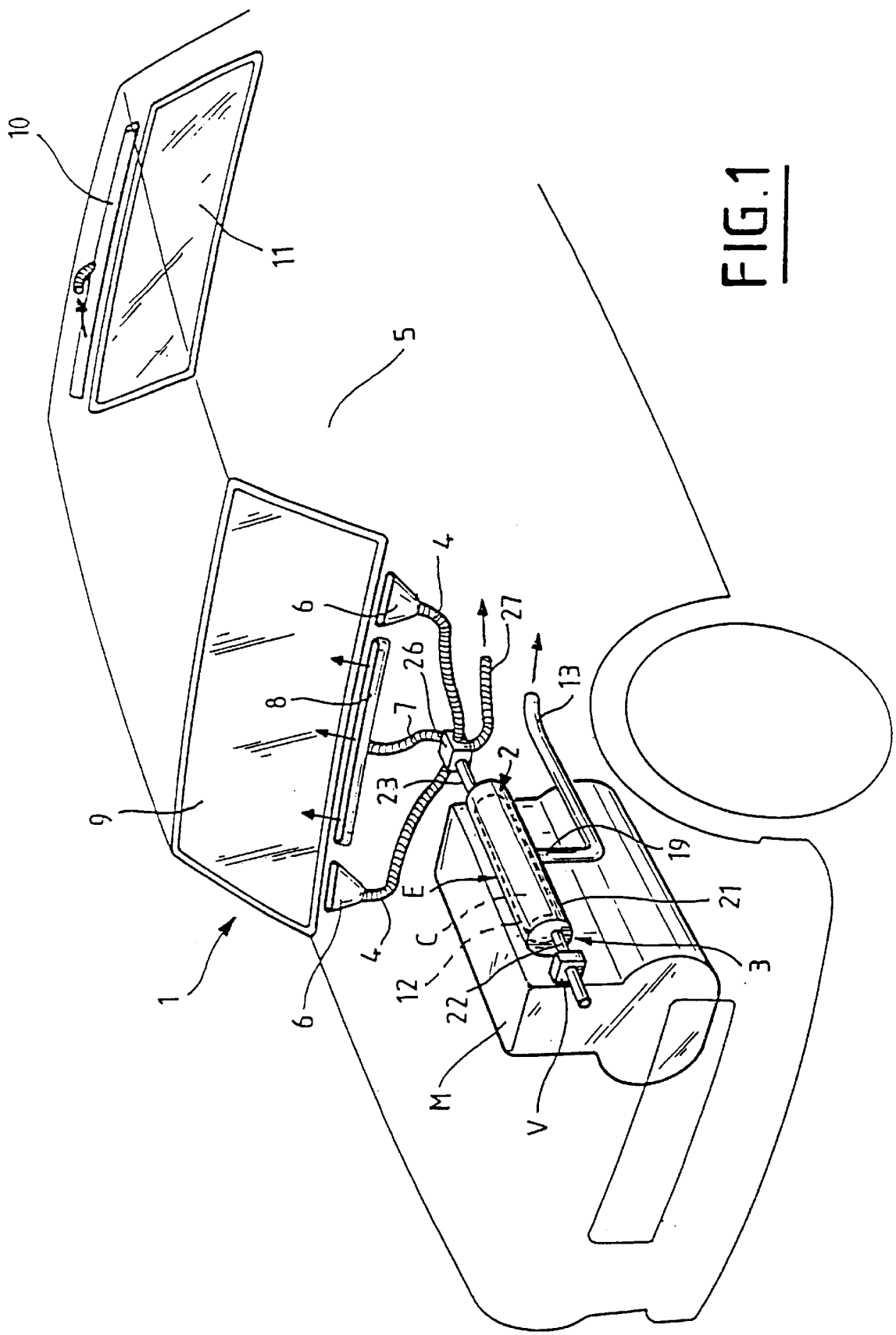
FIG. 1 is a skeleton and perspective view of a vehicle fitted with a heating device under the invention.

On FIG. 1 is shown diagrammatically and in perspective a motor vehicle (1) fitted with the heating device (2) according to the invention. As we can see on the figure, the heating device (2) comprises a heat exchanger (3) which is connected by a system of 4 ducts to the passenger compartment (5) of the vehicle (1), these ducts (4) leading, as usual, to the front of compartment (5) through heated air outlets (6). Moreover, to ensure the de-icing function of the heating device (2), the heat exchanger (3) is also connected, through a pipe (7) to the first de-icing (8) which is meant for de-icing the windshield (9) of the vehicle (1) and which is placed on the lower part of the said windshield. The said is to blow heated air, as indicated by the arrows, on the windshield. An analogous (10) can also be provided for on the upper part of the back window (11) which will be also connected through a pipe (27) to the heat exchanger (3).

Additionally and under the invention, the heat exchanger (3) is placed at exhaust (E) of the vehicle engine (M) while the heat exchanger (3) primary circuit (12) will be connected, on the one hand, to the outlet of the engine (M) cylinders (C) so as to be crossed by exhaust gases of the engine and, on the other hand, linked to the exhaust pipe (13) leading to the muffler (not represented).

Figure 2:
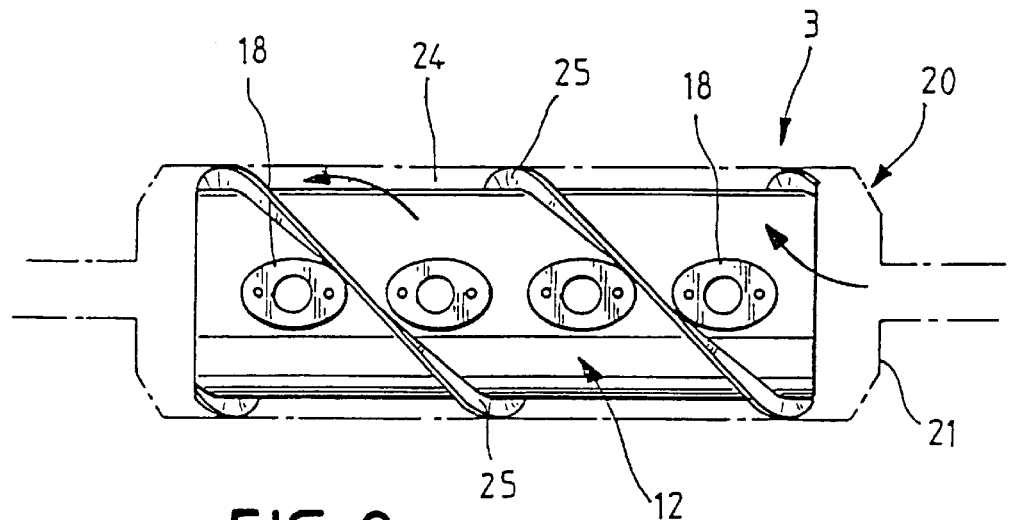
FIG. 2 shows a side view of the heat exchanger related to the heating device under the invention.
Figure 3:
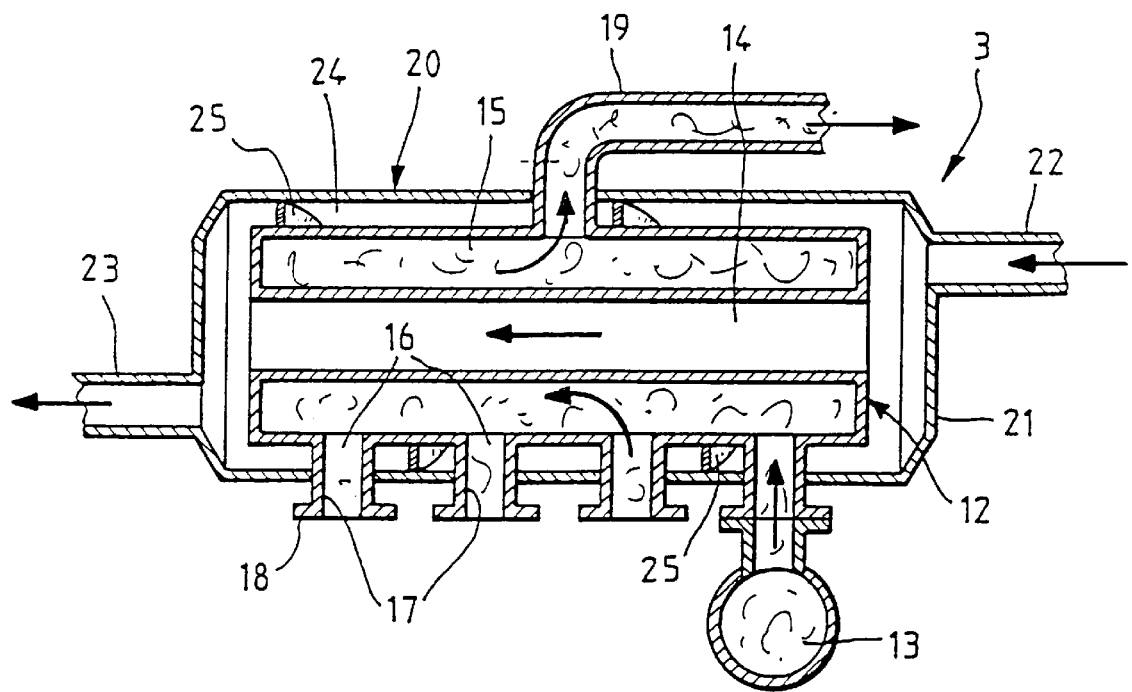
FIG. 3 is a cross section view similar to FIG. 2 but rotated by 90°.

More precisely, as it is better shown on FIGS. 2 and 3, the heat exchanger (3) primary circuit (12) has the general shape of a cylindrical case crossed on its length by a central pipe (14) forming thus around the pipe (14) a ring-shaped chamber (15) between the outer wall of the pipe (14) and the inner wall of the case, the same chamber fitted, on the one hand, by side holes (16) each of them meant for being connected through a short duct (17) to each exhaust vent of every cylinder of the engine (M).

Each duct (17) is fitted with a clamp (18) to fasten it to the said vent. On the other hand, the ring-shaped chamber affords a connection (19) to the exhaust pipe (13). Moreover, the secondary circuit (20) of the heat exchanger (3) is made up of a cylindrical cover (21) completely surrounding the primary circuit (12) of the case and comprising an inlet hole (22) for fresh air and outlet (23) for air heated by the exhaust gases crossing the ring-shaped chamber (15) of the primary circuit (12). In fact, as shown by the arrows on the figures, fresh air getting from outside in the cover (21) of the secondary circuit is heated on crossing both the central pipe (14) and the ring-shaped space (24) between the outer wall of the case (12) and the inner wall of the cover (21), as the same space is concentric to the pipe (14) and to the ring-shaped chamber (15).

Additionally, in the said ring-shaped space (24) are favorably provided for radial blades (25) serving, on the one hand, as spacer frames between the case (12) and the cover (21) and preferably taking a helicoid shape, as indicated, to allow, on the other hand, the air circulating in the said ring-shaped space (24) to be guided.

Preferably, a blower (fan) V (FIG. 1) will be provided for upstream the secondary circuit (20) cover inlet of the heat exchanger (3) in order to blow the heated air toward the passenger compartment of the vehicle and toward the front and rear windows. The blower can be driven manually or electronically namely with a thermostat.

Besides, a stub duct (26) symbolically represented, can be provided for downstream the outlet duct (23) of the secondary circuit (20) to help adjust the heated air output and its spreading over to heat the passenger compartment and/or de-ice the front and/or the rear windows.

It is to be noted, moreover, that the lower face of the engine compartment must be closed. Additionally, air getting in the front of the vehicle through the radiator should be evacuated between the hood and the windshield as well as the heated air coming from the heating device.

The plate obstructing the underside of the engine (parquet) should let a passage to accede to the drain plug while a sleeve will ensure heat insulation on the portion of the muffler exhaust pipe between the heating device and the parquet.

I claim:

1. A heating device for a motor vehicle for heating a passenger compartment of the motor vehicle or de-icing a front window or a rear window of the vehicle, comprising a heat exchanger which includes primary and secondary circuits, wherein the heat exchanger is connected through a system of ducts to the passenger compartment of the vehicle, or the front window of the vehicle, or the rear window of the vehicle, wherein the heat exchanger is placed at a vehicle engine exhaust with the primary circuit of the exchanger connected between a plurality of exhaust vents of engine cylinders and an exhaust pipe leading to a muffler, wherein the primary circuit of the heat exchanger takes the general form of a cylindrical case and is crossed at least on a major part of its length by at least one central pipe to form a ring-shaped chamber, wherein the cylindrical case has a plurality of sides holes communicated with the exhaust vents of the engine cylinders and the exhaust pipe, and wherein the secondary circuit of the heat exchanger is made up of a cylindrical cover that surrounds the primary circuit and includes a fresh air inlet hole and a heated air outlet.

2. The heating device according to claim 1, wherein the central pipe, the case of the primary circuit and the cover of the secondary circuit are concentric.

3. The heating device according to claim 2, wherein radial blades are provided and serve as spacer frames between the case of the primary circuit and the cover of the secondary circuit.

4. The heating device according to claim 3, wherein the blades are helicoid-shaped.

5. The heating device according to claim 1, wherein a blower is provided upstream of the fresh air inlet hole of the secondary circuit of the heat exchanger, to blow heated air toward the heated air outlet.

6. The heating device according to claim 5, wherein the blower is controlled by a thermostat.

7. The heating device according to claim 1, wherein a stub duct is provided downstream of the heated air outlet of the secondary circuit to allow the heated air to be adjusted and to spread over to heat the passenger compartment or de-ice the front or the rear window.

8. The heating device according to claim 1, further comprising a first de-icing vent to de-ice a windshield of the vehicle, wherein the first de-icing vent is placed at a lower part of the windshield and is connected to the heated air outlet of the heat exchanger.

9. The heating device according to claim 8 further comprising a second de-icing vent to de-ice the back window, wherein the second de-icing vent is connected to the heated air outlet of the heat exchanger.

10. The heating device according to claim 2, wherein a blower is provided upstream of the fresh air inlet hole of the secondary circuit of the heat exchanger, to blow heated air toward the heated air outlet.

11. The heating device according to claim 3, wherein a blower is provided upstream of the fresh air inlet hole of the secondary circuit of the heat exchanger, to blow heated air toward the heated air outlet.

12. The heating device according to claim 4, wherein a blower is provided upstream of the fresh air inlet hole of the secondary circuit of the heat exchanger, to blow heated air toward the heated air outlet.

13. The heating device according to claim 2, wherein a stub duct is provided downstream of the outlet of the secondary circuit to allow the heated air to be adjusted and to spread over to heat the passenger compartment or de-ice the front or the rear window.

14. The heating device according to claim 3, wherein a stub duct is provided downstream of the outlet of the secondary circuit to allow the heated air output to be adjusted and to spread over to heat the passenger compartment or de-ice the front or the rear window.

15. The heating device according to claim 4, wherein a stub duct is provided downstream of the outlet of the secondary circuit to allow the heated air to be adjusted and to spread over to heat the passenger compartment or de-ice the front or the rear window.

16. The heating device according to claim 1 further comprising a first de-icing vent to de-ice a windshield of the vehicle, wherein the first de-icing vent is placed at a lower part of the windshield and is connected through a pipe to the outlet of the heat exchanger.

17. The heating device according to claim 2 further comprising a first de-icing vent to de-ice a windshield of the vehicle, wherein the first de-icing vent is placed at a lower part of the windshield and is connected through a pipe to the outlet of the heat exchanger.

18. The heating device according to claim 3 further comprising a first de-icing vent to de-ice a windshield of the vehicle, wherein the first de-icing vent is placed at a lower part of the windshield and is connected through a pipe to the outlet of the heat exchanger.

19. The heating device according to claim 16 further comprising a second de-icing vent to de-ice the back window, wherein the second de-icing vent is connected to the heated air outlet of the heat exchanger.

20. The heating device according to claim 17 further comprising a second de-icing vent to de-ice the back window, wherein the second de-icing vent is connected to the heated air outlet of the heat exchanger.

21. The heating device according to claim 18 further comprising a second de-icing vent to de-ice the back window, wherein the second de-icing vent is connected to the heated air outlet of the heat exchanger.

* * * * *

UNITED STATES PATENT AND TRADEMARK OFFICE
CERTIFICATE OF CORRECTION

PATENT NO.   : 5,915,619
DATED        : June 29, 1999
INVENTOR(S)  : Pierre Etheve It is certified that error appears in the above-identified patent and that said Letters Patent is hereby corrected as shown below:

Title page,
Item [75], Inventor's new address should read -- Vilcort, 03420 Ronnet, France. --

Column 1,
Line 4, after "such a", please insert -- heating device --.

Column 2,
Line 24, afte "de-icing", please insert -- vent --.
Line 26, after "The said", please insert -- de-icing vent --.
Line 28, after "analogous", please insert -- de-icing vent --.

Signed and Sealed this

Seventh Day of January, 2003

JAMES E. ROGAN
*Director of the United States Patent and Trademark Office*